United States Patent
Miyahara et al.

[11] Patent Number: 5,876,640
[45] Date of Patent: Mar. 2, 1999

[54] PROCESS FOR PRODUCING A COATING FLUID HOLDING MEMBER

[75] Inventors: Yoshihisa Miyahara; Kohichi Kimura; Yoshiyuki Motoyoshi, all of Kanagawa; Tatsuo Takagi, Shizuoka; Osamu Horiuchi, Shizuoka; Nobuya Tomosue, Shizuoka; Toshihisa Okabe, Shizuoka; Hiromi Furuya, Tochigi, all of Japan

[73] Assignees: Nichias Corporation, Tokyo; Zenith Corporation, Kuroiso, both of Japan

[21] Appl. No.: 674,806

[22] Filed: Jul. 3, 1996

[30] Foreign Application Priority Data

| Jul. 4, 1995 | [JP] | Japan | 7-189734 |
| Aug. 11, 1995 | [JP] | Japan | 7-225982 |
| Mar. 29, 1996 | [JP] | Japan | 8-099498 |

[51] Int. Cl.$^6$ ................................ B29C 65/00
[52] U.S. Cl. ................. 264/42; 264/44; 264/45.3
[58] Field of Search ................ 264/41, 42, 43, 264/299, 45.3

[56] References Cited

U.S. PATENT DOCUMENTS

| 3,812,782 | 5/1974 | Funahashi | 101/367 |
| 4,608,361 | 8/1986 | Kanamori et al. | 502/232 |
| 4,746,287 | 5/1988 | Lannutti | 431/328 |
| 4,757,347 | 7/1988 | Tamaoki et al. | 355/3 FU |
| 4,868,142 | 9/1989 | Waisala et al. | 501/85 |

FOREIGN PATENT DOCUMENTS

| 34 33 315 | 3/1986 | Germany . |
| 41 05 674 | 8/1992 | Germany . |
| 59-73762 | 5/1984 | Japan . |
| 61-6381 | 2/1986 | Japan . |
| 60-136782 | 7/1986 | Japan . |
| 1 401 231 | 7/1975 | United Kingdom . |

OTHER PUBLICATIONS

Database WPI, Section Ch, Week 8946, Derwent Publications Ltd., London, GB; Class A81, AN 89–337133 XP002015470 & JP–A–01 252 588 (Matsushita Elec Ind KK), Oct. 9, 1989.

Database WPI, Section Ch, Week 9015, Derwent Publications Ltd., London, GB; Class H06, AN 90–112549 XP002015471 & JP–A–02 064 073 (Matsushita Elec Ind KK), Mar. 5, 1990.

*Primary Examiner*—Christopher A. Fiorilla
*Attorney, Agent, or Firm*—Pillsbury Madison & Sutro LLP

[57] ABSTRACT

A coating fluid holding member including a porous molded body which is formed of heat-resistant fibers (or a mixture of heat-resistant fibers and a filler) bound to each other with a binder, has intercommunicating pores having an average pore size of 1 to 500 $\mu$m, and has a porosity of 20 to 90%, and a coating fluid holding member including a porous molded body which is formed of heat-resistant fibers bound to each other with a binder, contains fine intercommunicating interstices between fibers and uniformly distributed pores having a diameter of 0.05 to 2 mm, and has a porosity of 30 to 90%. The holding member has a high fluid holding capacity for its volume and releases the coating fluid, such as a parting agent, an oil or a coating compound, in a stable manner for an extended period of time.

6 Claims, 2 Drawing Sheets

PROCESS FOR PRODUCING A COATING FLUID HOLDING MEMBER

FIELD OF THE INVENTION

This invention relates to a coating fluid holding member which is used in a coating applicator for uniformly applying a coating fluid, such as a parting agent, an oil, a coating compound, etc.

BACKGROUND OF THE INVENTION

Applicators for applying a coating fluid for modifying surface properties of an article, such as a parting agent, an oil or a coating compound, to the surface of the article are composed of a coating member which is brought into direct contact with an article to be coated and a coating fluid holding member which holds a coating fluid and supplies the coating fluid to the coating member.

Large-sized coating equipment usually has a separate container, such as a tank, as a coating fluid holding member. For coating equipment with small consumption of a coating fluid, there is a coating fluid holding member which is used in the form integrated with a coating member.

Known coating fluid holding members of the latter type include a hollow pipe made of, e.g., metal having a number of small through-holes, with a coating fluid held in its hollow portion so as to be released little by little through the through-hole to a coating member provided in intimate contact with the outer surface of the pipe (see JP-U-59-73762 and JP-A-60-136782) and a synthetic resin foamed body having open cells, in which a coating fluid is infiltrated and oozed therefrom through capillary action (JP-B-61-6381). The terms "JP-U", "JP-A" and "JP-B" as used herein means an unexamined published Japanese utility model application, an unexamined published Japanese patent application, and an examined published Japanese patent publication, respectively.

A coating applicator should be such that a coating fluid can be applied at a constant rate without excess nor shortage. From this point of view, the stability of coating fluid supply is important for the above-mentioned type of coating fluid holding members which are not equipped with a constant delivery means, such as a pump. It is desirable for the coating fluid holding member to keep furnishing a fixed amount of a coating fluid in a stable manner from the start of use until the coating fluid held thereby is almost exhausted. It is also desirable for the coating fluid holding member to have as high a capacity as possible so that it may be used for as long a period of time as possible.

However, conventional coating fluid holding members having a high fluid holding capacity tend to cause considerable variation in feed rate with decrease of the residual coating fluid, while those having feed stability tend to have a small capacity and must be exchanged more frequently.

SUMMARY OF THE INVENTION

An object of the present invention is to provide a coating fluid holding member which can hold a sufficient amount of coating fluid and furnish the coating fluid in a stable manner for an extended period of time.

The invention provide s in its first embodiment a coating fluid holding member comprising a porous molded body which is formed of heat-resistant fibers (or a mixture of heat-resistant fibers and a filler) bound to each other with a binder, has intercommunicating pores having an average pore size of 1 to 500 $\mu$m, and has a porosity of 20 to 90%.

The invention also provides a process for producing the coating fluid holding member according to the first embodiment, which comprises kneading 100 parts by weight of heat-resistant fibers or a mixture of heat-resistant fibers and not more than 300% by weight, based on the heat-resistant fibers, of a filler, 2 to 100 parts by weight of a binder, and water, molding the resulting plastic mixture of components above-mentioned, and drying the molded body.

The invention provides in its second embodiment a coating fluid holding member comprising a porous molded body which is formed of heat-resistant fibers bound to each other with a binder, contains fine intercommunicating interstices between fibers (in which no binder exists) and uniformly distributed pores having a diameter of 0.05 to 2 mm, and has a porosity of 30 to 90%.

The invention also provides a process for producing the coating fluid holding member according to the second embodiment, which comprises kneading 100 parts by weight of heat-resistant fibers, 10 to 300 parts by weight of water-resistant organic particles having a particle size of 0.05 to 2 mm, 2 to 100 parts by weight of a binder, and water, molding the resulting plastic mixture of components above-mentioned, drying the molded body to harden the binder, and heating the molded body at 150° to 400° C. to remove the water-resistant organic particles.

The invention further provides another process for producing the coating fluid holding member of the second embodiment, which comprises kneading 100 parts by weight of heat-resistant fibers, 10 to 300 parts by weight of water-resistant organic particles having a particle size of 0.05 to 2 mm, 50 to 300 parts by weight of a mixture of an organic binder and an inorganic binder, and water, molding the resulting plastic mixture of components above-mentioned, drying the molded body to harden the binder, and calcining the molded body at 400° to 1000° C. to remove the water-resistant organic particles and the organic binder.

DETAILED DESCRIPTION OF THE INVENTION

Figure 1:
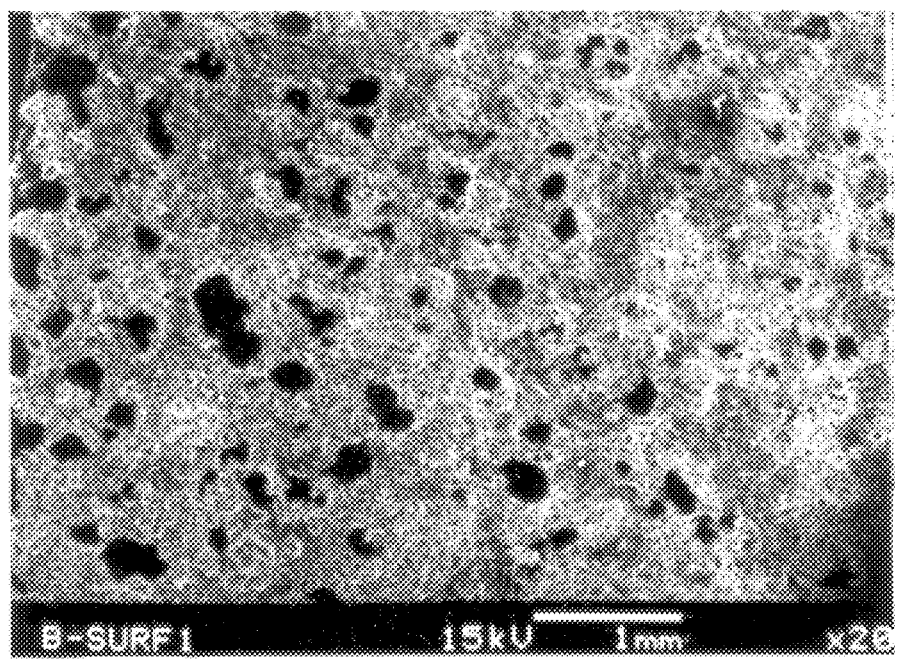
FIGS. 1 and 2 show electron micrographs of the surface and the cut area, respectively, of an example of the coating fluid holding member according to the second embodiment of the invention.

The term "porosity" as used herein means a value calculated from equation:

$$\text{Porosity (\%)} = (1 - \text{bulk specific gravity/true specific gravity}) \times 100$$

Accordingly, the "porosity" as for the coating fluid holding member of the invention is intended to mean a ratio of the total void volume inclusive of fine intercommunicating interstices between fibers and pores larger than them to the volume of the fibrous porous molded body.

The coating fluid holding member according to the first embodiment is first explained.

The coating fluid holding member of the first embodiment holds a coating fluid in its intercommunicating pores. When the coating fluid holding member impregnated with a coating fluid is brought into intimate contact with a coating member made of, e.g., felt for use as a coating applicator, some of the coating fluid permeates throughout the coating member through wetting and capillary action. On contact with an article to be coated, the coating member thus applies the coating fluid to the article. As the coating fluid in the coating member decreases, the coating fluid in the holding member successively oozes out so that the coating member is always kept wet with the coating fluid.

The coating fluid holding member should have an average pore size of 1 to 500 µm so that the coating member may be replenished with a coating fluid smoothly. If the pore size is smaller than 1 µm, the fluid holding power of the holding member due to a capillary phenomenon is too strong to sufficiently replenish the coating member with the coating fluid, and the coating member would be starved of the coating fluid when, for example, the equipment is in continuous operation for a long period of time. If the average pore size exceeds 500 µm, the holding power of coating fluid is so low that excessive coating fluid migrates to the coating member, which tends to result in excessive application, drips, stains, or the like troubles. The optimum average pore size considerably varies within the above range depending on the properties of a coating fluid, especially viscosity, and the conditions of use. In many cases, a suitable pore size for a particular coating fluid holding member should be within a narrower range than the above-specified one. It is desirable to experimentally confirm the optimum pore size for each case.

Where a coating fluid is held in intercommunicating pores, the porosity of the coating fluid holding member has an influence on the holding capacity of coating fluid rather than on the above-described oozing properties of coating fluid. The higher the porosity, the higher the holding capacity. If the porosity is less than 20%, the holding member can hold only a small amount of coating fluid, and the applicator has a short life with respect to continuous use. If the holding member has a porosity exceeding 90%, necessary strength for a coating fluid holding member is hardly secured.

The coating fluid holding member according to the second embodiment of the invention is then described.

Figure 2:
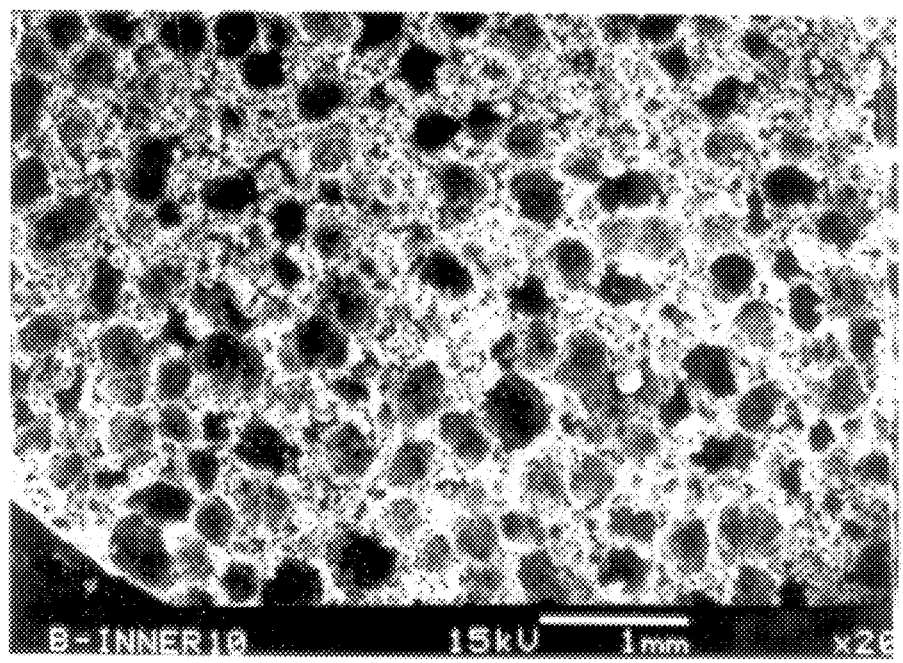
Figure 3:
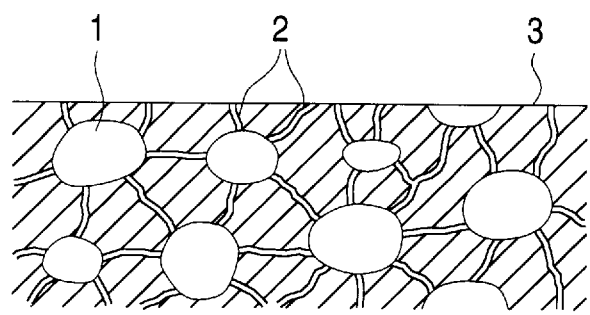
FIG. 3 is a schematic illustration showing the distribution of pores and fine interstices between fibers in the coating fluid holding member according to the second embodiment of the invention.

The micrographs of the surface and the cut area of the coating fluid holding member of the second embodiment are shown in FIGS. 1 and 2, respectively. FIG. 3 is a schematic illustration of the fibrous molded body, showing the distribution of pores and interstices between fibers in the coating fluid holding member. Pores 1 having a diameter of 0.05 to 2 mm are uniformly distributed throughout the molded body and are connected to each other via fine intercommunicating interstices 2 between fibers. Some of interstices 2 are open on the surface 3 of the molded body.

In this embodiment, a coating fluid is absorbed and held in the fine interstices and the pores larger than them. Similarly to the coating fluid holding member of the first embodiment, when the coating fluid holding member of the second embodiment is impregnated with a coating fluid and brought into intimate contact with a coating member made of, e.g., felt for use as an applicator, some of the coating fluid permeates throughout the coating member through wetting and capillary action. On contact with an article to be coated, the coating member thus applies the coating fluid to the article. As the coating fluid in the coating member decreases, the coating fluid in the holding member successively oozes out so that the coating member is always kept wet with the coating fluid.

As the coating fluid in the contact area with the coating member decreases, the coating fluid held in pores migrates by capillary action to the contact area mostly passing through a plurality of interstices. In other words, the pores serve as a reservoir of the coating fluid, while the interstices between fibers serve as main passageways for the coating fluid.

The coating fluid holding member should have a sufficient amount of intercommunicating interstices between fibers preferably having an average diameter of 5 to 30 µm so that the coating member may be replenished with coating fluid smoothly. If the diameter is smaller than 5 µm, smooth replenishment through capillary action does not take place, and the coating member would be starved of the coating fluid in case where, for example, coating load is large or the equipment is in continuous operation for a long period of time. If the diameter of the interstices is too large, the fluid holding power is so low that excessive coating fluid migrates to the coating member, which tends to result in excessive application, drips, stains, or the like troubles. The optimum average size (diameter) of the intercommunicating interstices between fibers considerably varies depending on the properties of a coating fluid, especially viscosity, and the conditions of use. In many cases, a suitable size of the interstices for a particular coating fluid holding member should be within a narrower range than the above-specified one. It is desirable to experimentally confirm the optimum size of the interstices for each case.

As the size and/or the number of the large pores functioning as a reservoir increase, the fluid holding capacity would increase, but the mechanical strength of the holding member would be reduced. Accordingly, it is preferable that the porous structure has an appropriate amount of pores having a diameter of about 0.5 to 2 mm, that usually gives a porosity of about 30 to 90%.

The coating fluid holding member of the above-described first embodiment can be produced by, for example, kneading heat-resistant fibers, a binder, and water, molding the resulting plastic mixture of components above-mentioned, and drying the molded body.

The heat-resistant fiber which can be used in this embodiment include rock wool, aluminosilicate fiber, alumina fiber, glass fiber, and aramid fiber. The diameter of the heat-resistant fiber influences the size of intercommunicating pores. In order to form large size of intercommunicating pores, fibers having a diameter of about 2 to 15 µm are used to advantage.

If desired, the amount of intercommunicating pores can be controlled by using up to about 300% by weight, based on the heat-resistant fiber, of a filler. Examples of suitable fillers include ball clay, kaolin, bentonite, alumina, and silica. The addition of the filler or an increase of the addition amount thereof reduces the amount of the intercommunicating pores. If the proportion of the filler to be used in combination exceeds 300% by weight based on the heat-resistant fiber, it is difficult to secure the minimum essential volume of intercommunicating pores necessary for desirable fluid holding and oozing properties.

The binder used includes organic ones, such as methyl cellulose, carboxymethyl cellulose, hydroxymethyl cellulose, hydroxyethyl cellulose, polyvinyl alcohol, phenolic resins, polyacrylic esters, and sodium polyacrylate; and inorganic ones, such as colloidal silica, alumina sol, sodium silicate, lithium silicate, and glass frit. Note that the binder selected should not be dissolved out in the coating fluid to be held.

The heat-resistant fiber, binder, and filler, if used, are kneaded together with an adequate amount of water to form a uniform plastic mixture. The amounts of the binder and water govern the porosity. While varying depending on the product characteristics required, a suitable mixing ratio of the raw materials is generally 100 parts by weight of the heat-resistant fiber (or a mixture of the heat-resistant fiber and the filler), 2 to 100 parts by weight of the binder, and an adequate amount (usually 20 to 200% by weight based on the total amount of the above-mentioned raw materials) of water.

The resulting plastic mixture is molded into a prescribed shape, such as a rod, a cylinder, a plate, etc., according to the end use. The molding method is not particularly limited and is arbitrarily selected from extrusion, press molding, and the like according to the product shape. The molded body is then dried at ambient temperature or under heat to remove the water content and to harden the binder. If desired, the dried molded body may be calcined at 600° to 1500° C.

The coating fluid holding member of the first embodiment thus obtained is excellent in not only fluid holding and oozing properties but mechanical strength and durability.

The coating fluid holding member of the above-described second embodiment can be produced by, for example, kneading heat-resistant fibers, a water-resistant organic particles, a binder, and water, molding the resulting plastic mixture of components above-mentioned, drying the molded body, and heating and/or calcining the thus hardened body to remove the water-resistant organic particles.

The heat-resistant fiber, filler, and binder which can be used for producing the coating fluid holding member of the second embodiment are the same as those useful in the first embodiment.

The water-resistant organic particles are used for formation of large pores. It is suitable to use water-resistant organic particles made of various synthetic resins, such as polypropylene, polyethylene, polystyrene, and acrylic resins. Expanded resin beads can also be used. Additionally, grinds of naturally-occurring water-resistant organic substances, such as wood, and carbon powder are also useful. It is necessary for this material to be "water-resistant" in order to retain its particulate shape until the raw materials are kneaded with water, molded, and dried.

The water-resistant organic particles should have a particle size of at least 0.05 mm. If the particle size is less than 0.05 mm, the formed pores are too small to serve as a reservoir. Particles exceeding 2 mm in diameter form too large pores, which impair the physical properties and the uniformity of the product.

The proportion of the water-resistant organic particles governs the total volume of pores formed in the product. Therefore, the fluid holding capacity of the holding member can be adjusted by varying the proportion of this material.

Organic binders manifest strength on molding and drying thereby making the subsequent handling easier. In addition, most of organic binders increase the viscosity of the plastic mixture to facilitate molding. On the other hand, inorganic binders are retained even when molded and calcined at high temperature, e.g., up to 1000° C. and maintain their binding force. Therefore, it is advantageous in the second embodiment to use both the organic binder and the inorganic binder in combination. It is recommended to use the inorganic binder in a proportion sufficient for assuring the necessary strength and hardness of the final product, while using the organic binder as an auxiliary binder for securing moldability of the plastic mixture and molded body strength before calcination.

The heat-resistant fiber (and filler if used), heat-resistant organic particles, and binder are kneaded together with an adequate amount of water to form a uniform plastic mixture. The amounts of the binder and water govern the size and amount of the fine interstices formed between fibers, while varying depending on the kind of binders used, the heating temperature after molding, and the product characteristics required.

Where a coating fluid holding member of the second embodiment is produced by a process including the step of heating at 150° to 400° C., a suitable mixing ratio of the raw materials is generally 100 parts by weight of the heat-resistant fiber (or a mixture of the heat-resistant fiber and the filler), 10 to 300 parts by weight of the water-resistant organic particles, 2 to 100 parts by weight of the binder, and an adequate amount (usually 20 to 200% by weight based on the total amount of the above raw materials) of water.

The resulting plastic mixture is molded into a prescribed shape, such as a rod, a cylinder, a plate, etc., according to the end use. The molding method is not particularly limited and is arbitrarily selected from extrusion, press molding, and the like according to the product shape. The molded body is then dried at ambient temperature or under heat to remove the water content and to harden the binder. The fine intercommunicating interstices between fibers are formed in this step. Then, the molded body is heated at about 150° to 400° C., whereupon the organic particles are burnt or decomposed and gasified to leave pores.

The heating step to remove the organic particles is unavoidably accompanied with carbonization or burning of some of the organic binder. It is preferable to minimize such partial denaturation or disappearance of the organic binder. If all the binder is organic, the heating condition would be restricted. Where the binder comprises an inorganic binder as a main component and an organic binder as an auxiliary component, since sufficient product strength can be retained even if all the organic binder is burnt out, the molded body can be calcined at a high temperature of from about 400° to about 1000° C. On calcining at such a high temperature, the organic particles can be removed completely and, at the same time, inorganic binder can be hardened completely, thereby making it possible to take full advantage of the use of the organic particles and the inorganic binder. In this case, a suitable mixing ratio of the raw materials is generally 100 parts by weight of the heat-resistant fiber (and the filler if used), 10 to 300 parts by weight of the water-resistant organic particles, 50 to 300 parts by weight of the binder, and an adequate amount (usually 20 to 200% by weight based on the total amount of the above raw materials) of water.

Prior to calcination, the molded body may be preheated at 150° to 400° C. for preventing generation of cracks which may be caused by abrupt disappearance of the organic particles when calcination is conducted at a high temperature of from 400° C. to about 1,000° C.

The coating fluid holding member of the second embodiment thus prepared is excellent in not only fluid holding and feeding properties but mechanical strength and durability.

Where the coating fluid holding member of the first or second embodiment has a cylindrical form, not only the pores of the holding member but the hollow part of the cylinder serve as a reservoir.

The present invention will now be illustrated in greater detail with reference to Examples, but it should be understood that the present invention is not deemed to be limited thereto. Unless otherwise indicated, all the parts are by weight.

EXAMPLE 1

A plastic mixture was prepared by kneading 100 parts of aluminosilicate fiber having an average fiber diameter of 3.8 $\mu$m, 10 parts of carboxymethyl cellulose, and 95 parts of water. The plastic mixture was extrusion molded into a cylinder and dried at 105° C. to prepare a coating fluid holding member having an inner diameter of 8 mm, an outer diameter of 18 mm, and a length of 300 mm. The product had a porosity of 72.9%, an average pore size of 18.8 μm, and a bulk specific gravity of 0.64.

The resulting coating fluid holding member was soaked in silicone oil having a viscosity of 30000 cSt to pick up 36 g of the silicone oil. A driving shaft of 8 mm in diameter was inserted into the hollow portion of the oil-impregnated holding member, and each end of the holding member was fixed to the driving shaft with a ring fitment. Felt fabricated of heat-resistant aramid fiber was wound around the outer surface of the holding member to complete an oil coating roller.

The suitability of the oil coating roller as an applicator for applying a parting agent to a fixing roll of a copying machine was tested as follows. The coating roller was set on an oil oozing property testing machine, and change of the amount of oil released was examined under the same paper feed condition as in actual use of a copying machine. As a result, the amount of oil fed per 1000 sheets of paper was maintained from 0.07 g to 0.2 g, which is on a satisfactory level, until the number of sheets fed reached 100,000.

EXAMPLE 2

A mixture of 35 parts of aluminosilicate fiber having an average fiber diameter of 2.5 μm, 50 parts of ball clay, 10 parts (on a solid basis) of colloidal silica, and 5 parts of carboxymethyl cellulose was kneaded with 65% by weight, based on the mixture, of water. The resulting plastic mixture was extrusion molded into a cylinder and dried at 105° C. to prepare a coating fluid holding member having an inner diameter of 12 mm, an outer diameter of 20 mm, and a length of 300 mm. The product had a porosity of 38.4%, an average pore size of 15 μm, and a bulk specific gravity of 1.39.

A driving shaft of 8 mm in diameter was inserted into the hollow portion of the oil-impregnated holding member, and each end of the holding member was fixed to the driving shaft with a ring fitment. Felt fabricated of heat-resistant aramid fiber was wound around the outer surface of the holding member. Silicone oil having a viscosity of 500 cSt was injected into the space remaining between the inserted driving shaft and the inner wall of the cylinder to complete an oil coating roller.

The suitability of the oil coating roller as an applicator for applying a parting agent to a fixing roll of a copying machine was tested in the same manner as in Example 1. As a result, the amount of oil fed per 1000 sheets of paper was maintained from 0.1 g to 0.3 g, which is on a satisfactory level, until the number of sheets fed reached 100,000.

EXAMPLE 3

A plastic mixture was prepared by kneading 100 parts of aluminosilicate fiber having an average fiber diameter of 3.8 μm, 100 parts of polyethylene particles having an average particle size of 0.2 mm, 2.3 parts (on a solid basis) of colloidal silica, 20 parts of methyl cellulose, and 200 parts of water. The plastic mixture was extrusion molded into a cylinder and hardened by drying at 105° C. The molded body was heated at 250° C. for 5 hours to remove the polyethylene particles to obtain a coating fluid holding member having an inner diameter of 8 mm, an outer diameter of 20 mm, and a length of 300 mm. The product had fine interstices between fibers and pores of about 0.1 to 0.3 mm in diameter as shown in the electron micrographs of FIGS. 1 and 2, a porosity of 80%, and a bulk specific gravity of 0.4.

The coating fluid holding member was soaked in silicone oil having a viscosity of 10000 cSt to pick up 40 g of the silicone oil. A driving shaft of 8 mm in diameter was inserted into the hollow portion of the oil-impregnated holding member, and each end of the holding member was fixed to the driving shaft with a ring fitment. Felt fabricated of heat-resistant aramid fiber was wound around the outer surface of the holding member to complete an oil coating roller.

The suitability of the oil coating roller as an applicator for applying a parting agent to a fixing roll of a copying machine was tested in the same manner as in Example 1 (paper feed rate: 32 sheets/min). As a result, the amount of oil fed per 1000 sheets of paper was maintained between from 0.07 g to 0.2 g, which is on a satisfactory level, until the number of sheets fed reached 100,000. The oil consumption at the time when 100,000 sheets of paper had passed was 40%.

EXAMPLE 4

A plastic mixture was prepared by kneading 100 parts of aluminosilicate fiber having an average fiber diameter of 2.5 μm, 100 parts of polyethylene particles having an average particle size of 0.2 mm, 30 parts (on a solid basis) of sodium silicate, 20 parts of methyl cellulose, and 200 parts of water. The plastic mixture was extrusion molded into a cylinder and hardened by drying at 105° C. The molded body was calcined at 800° C. for 5 hours to remove the polyethylene particles to obtain a coating fluid holding member having an inner diameter of 8 mm, an outer diameter of 20 mm, and a length of 300 mm. The product had a porosity of 76% and contained fine interstices between fibers and pores of about 0.1 to 0.3 mm in diameter similarly to the product of Example 3. The product was more heat-resistant than that of Example 3 owing to the high-temperature calcination.

A silicone oil coating roller was prepared using the resulting coating fluid holding member and tested in the same manner as in Example 3 to give satisfactory results similarly to the product of Example 3.

As described above, the invention provides a coating fluid holding member which has a high fluid holding capacity for its volume and releases the coating fluid in a stable manner for an extended period of time even under a high load.

While the invention has been described in detail and with reference to specific examples thereof, it will be apparent to one skilled in the art that various changes and modifications can be made therein without departing from the spirit and scope thereof.

What is claimed is:

1. A process for producing a coating fluid holding member comprising kneading 100 parts by weight of heat-resistant fibers, 10 to 300 parts by weight of water-resistant organic particles having a particle size of 0.05 to 2 mm, 2 to 100 parts by weight of a binder, and water, molding a resulting plastic mixture of components above-mentioned to form a molded body, drying the molded body to harden said binder, and heating the molded body at 150° to 400° C. to remove said water-resistant organic particles.

2. The process of claim 1, wherein said step of molding is performed by extrusion molding.

3. The process of claim 1, wherein said step of molding is performed by extrusion molding said resulting plastic mixture into a cylinder.

4. A process for producing a coating fluid holding member comprising kneading 100 parts by weight of heat-resistant fibers, 10 to 300 parts by weight of water-resistant organic particles having a particle size of 0.05 to 2 mm, 50 to 300 parts by weight of a mixture of an organic binder and an inorganic binder, and water, molding a resulting plastic mixture of components above-mentioned to form a molded body, drying the molded body to harden, and calcining the molded body at 400° to 1000° C. to remove said water-resistant organic particles and said organic binder.

5. The process of claim 4, wherein said step of molding is performed by extrusion molding.

6. The process of claim 4, wherein said step of molding is performed by extrusion molding said resulting plastic mixture into a cylinder.

* * * * *